US010276015B2

United States Patent
Lang et al.

(10) Patent No.: US 10,276,015 B2
(45) Date of Patent: Apr. 30, 2019

(54) SYSTEM AND METHOD FOR MARKING AND IDENTIFYING BALED CROP

(71) Applicant: DEERE & COMPANY, Moline, IL (US)

(72) Inventors: Eric R. Lang, Newhall, IA (US); Daniel E. Derscheid, Hedrick, IA (US); Valentin Gresch, Ensheim (DE); Martin Kremmer, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 199 days.

(21) Appl. No.: 15/208,010

(22) Filed: Jul. 12, 2016

(65) Prior Publication Data

US 2017/0287303 A1 Oct. 5, 2017

(30) Foreign Application Priority Data

Apr. 5, 2016 (DE) .................. 10 2016 205 626

(51) Int. Cl.
*G08B 21/02* (2006.01)
*A01F 15/07* (2006.01)
(Continued)

(52) U.S. Cl.
CPC ........ *G08B 21/0275* (2013.01); *A01F 15/071* (2013.01); *A01F 15/08* (2013.01);
(Continued)

(58) Field of Classification Search
CPC . H02J 50/20; B60Q 1/50; G07C 5/085; B60R 202/4816; B60R 2022/4816
(Continued)

(56) References Cited

U.S. PATENT DOCUMENTS

| 2,367,189 A | 1/1945 | Avery |
| 6,360,179 B1 * | 3/2002 | Reep .................. A01D 41/127 |
| | | 702/104 |

(Continued)

FOREIGN PATENT DOCUMENTS

WO 2012028581 A1 3/2012

OTHER PUBLICATIONS

European Patent Office, Extended European Search Report for Application No. 17163904.0, dated Jun. 16, 2017, 9 Pages.

*Primary Examiner* — Joseph H Feild
*Assistant Examiner* — Sharmin Akhter
(74) *Attorney, Agent, or Firm* — Taft Stettinius & Hollister LLP; Stephen F. Rost

(57) ABSTRACT

A method for storing information corresponding to a baled crop during a baling process includes providing a harvesting machine including a control unit, a sensor, and a bale tag reader. The method also includes forming the baled crop with a bale tag by the harvesting machine, identifying the baled crop by the control unit with a bale identifier, and sensing a characteristic of the baled crop by the sensor. The method further includes detecting a bale tag identifier associated with the bale tag by the bale tag reader, communicating the characteristic and bale tag identifier to the control unit, corresponding the characteristic, bale tag identifier and bale identifier of the baled crop to one another, and storing the characteristic, bale tag identifier and bale identifier in an electronic storage unit that is in electrical communication with the control unit.

24 Claims, 7 Drawing Sheets

(51) Int. Cl.
*A01F 15/08* (2006.01)
*A01F 15/14* (2006.01)

(52) U.S. Cl.
CPC .......... *A01F 15/14* (2013.01); *G08B 21/0283* (2013.01); *G08B 21/0288* (2013.01); *A01F 2015/076* (2013.01); *A01F 2015/0745* (2013.01)

(58) Field of Classification Search
USPC .................................. 340/457–457.4, 539.13
See application file for complete search history.

(56) References Cited

U.S. PATENT DOCUMENTS

| | | | |
|---|---|---|---|
| 7,717,149 | B2 | 5/2010 | Johnson |
| 8,087,216 | B2 | 1/2012 | Noonan et al. |
| 8,671,834 | B1 | 3/2014 | Rotole et al. |
| 2009/0107349 | A1* | 4/2009 | Noonan ................ A01F 15/071 100/14 |
| 2009/0217827 | A1 | 9/2009 | Duenwald et al. |
| 2012/0319837 | A1* | 12/2012 | Foster .................... A01D 46/08 340/539.32 |
| 2013/0160661 | A1* | 6/2013 | Duenwald ........... A01F 15/0715 100/40 |
| 2014/0125501 | A1* | 5/2014 | Baade ..................... G01S 19/16 340/989 |
| 2014/0157999 | A1 | 6/2014 | Verhaeghe et al. |
| 2015/0208586 | A1 | 7/2015 | Lang et al. |
| 2015/0310323 | A1 | 10/2015 | Foster et al. |
| 2016/0081276 | A1 | 3/2016 | Riesterer et al. |

\* cited by examiner

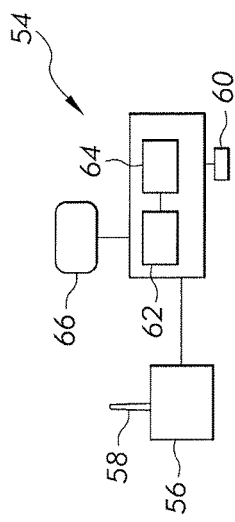
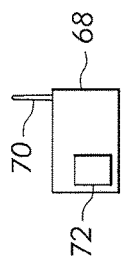
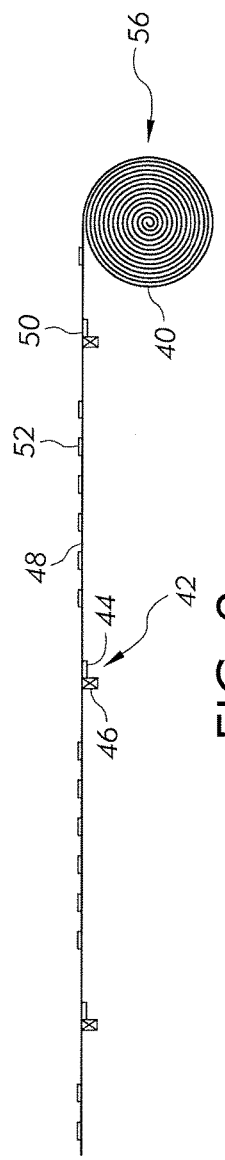
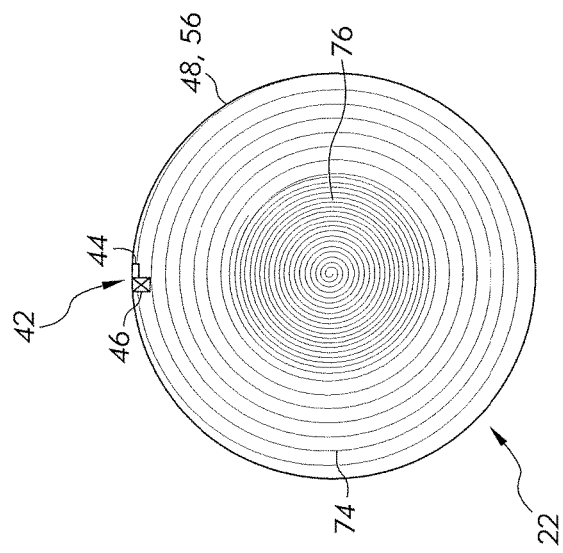

| Bale ID | Tag ID #1 | Tag ID #2 | Parameter #1 | Parameter #2 | Parameter #3 | Parameter #x |
|---|---|---|---|---|---|---|
| 1 | 1001 | NA | 14% | 1500 | 90 | 1 |
| 2 | 1002 | NA | 13% | 1475 | 88 | 1 |
| 3 | 1003 | 1004 | 15% | 1496 | 89 | 1 |
| 4 | 1005 | NA | 13% | 1521 | 90 | 1 |
| 5 | 1006 | NA | 12% | 1483 | 91 | 1 |
| 6 | 1007 | NA | 15% | 1426 | 88 | 0 |
| 7 | 1008 | NA | 13% | 1511 | 89 | 0 |
| 8 | 1009 | NA | 14% | 1478 | 89 | 1 |
| 9 | 1010 | 1011 | 16% | 1592 | 90 | 1 |
| 10 | 1012 | NA | 12% | 1428 | 89 | 1 |
| 11 | 1013 | NA | 15% | 1402 | 88 | 1 |
| 12 | 1014 | NA | 14% | 1465 | 90 | 0 |
| 13 | 1015 | NA | 15% | 1470 | 91 | 1 |
| 14 | 1016 | NA | 13% | 1488 | 89 | 0 |

SYSTEM AND METHOD FOR MARKING AND IDENTIFYING BALED CROP

RELATED APPLICATIONS

The present applications claim priority to German Application Ser. No. 102016205626.3, filed Apr. 5, 2016, the disclosure of which is hereby incorporated by reference in its entirety.

FIELD OF THE DISCLOSURE

The present disclosure relates to a work machine for baling crop, and more particularly to a system and method of marking and identifying baled crop.

BACKGROUND

Hay and foraging equipment are utilized in the processing of plant material and include mowers, conditioners, flail choppers, windrowers, and balers for both dry and silage uses. The hay system, such as a square baler, includes a pickup mechanism, which picks crop material from the ground and supplies it to a bale-forming chamber. The bale-forming chamber receives the crop material and includes a plunger or piston that applies an axial force against an accumulation of the crop material to form a substantially square-shaped bale. The plunger or piston can further apply a force to a face of the bale to further densify the bale. Once the bale reaches a certain or desired density, the bale may be pushed and extruded out the rear of the baler.

SUMMARY

In one embodiment, the present disclosure provides a method for monitoring properties of organic material to be stored in the absence of air in a bale wrapped with film, to a bale composed of organic material to be stored in the absence of air and wrapped in a bale, to an arrangement for pressing organic material into a bale or for wrapping organic material to be stored in the absence of air that has been pressed into a bale with wrapping film, to a combination of such an arrangement and a reading device for reading out sensor data, as well as to a reading device for sensor data from a sensor assembly that is in contact with organic material to be stored in the absence of air that has been pressed into a film-wrapped bale, wherein the sensor assembly is equipped with a sensor for detecting properties of the material and an electronic transmitting device connected to the sensor for transmitting sensor data, and the reading device comprises a receiving device for receiving the sensor data, a processor for processing sensor data, a memory and a display device for displaying the processed sensor data.

In order to monitor properties of organic material to be stored in the absence of air in a bale wrapped with film, a sensor assembly may include a sensor for detecting properties of the material and an electromagnetic transmitting device connected to the sensor in order to transmit sensor data to a reading device. The sensor may be brought into contact with the material before wrapping the bale with film or while wrapping the bale with film. In other words, a sensor assembly, equipped with a sensor for detecting properties of the material and an electromagnetic transmitting device connected to the sensor in order to transmit sensor data to a reading device, is brought into contact with the material of the bale. The sensor assembly can thus be inserted into the material forming the bale before the bale is pressed, or after pressing, or can be mounted on the surface thereof.

Alternatively, a wrapping material (film, twine or netting) may be secured in a manner such that it is possible for the sensor assembly to ultimately come into contact with the material of the bale. This can be done onboard a baler or when the bale is lying on the field before wrapping, e.g., by hand or by means of a suitable device, or on a baler before wrapping or while wrapping the bale with a plastic film. Subsequently, the sensor of the sensor assembly is in contact with material of the bale that is wrapped with a film. The sensor data can be read out with a reading device and the bale status detected by the sensor can be captured without having to puncture the film and thus destroy the exclusion of air.

In a further embodiment, the sensor assembly is fixed to the side of the film facing the bale and then the film is wrapped along with the sensor assembly around the bale. The sensor assembly may be withdrawn from a supply onboard the baler and applied (e.g. laminated or glued) to the film that will then be wrapped around the bale. Alternatively, a supply of film can be provided with a plurality of sensor assemblies by the manufacturer and sections thereof that each contain one or more sensor assemblies can be wrapped around the bale.

On the side of the film furnished with the sensor assemblies, the supply of film can be provided with markings that facilitate finding the sensor assembly. An operator can thus orient the reading device to the sensor assembly or, if a short-range electromagnetic transmission technology such as near field communication or RFID technology is used between the sending device of the sensor assembly and the reading device, can bring the reading device near the sensor assembly in order to ensure that the data of a respective desired bale is displayed. It is also conceivable, however, to read out a plurality of sensor assemblies simultaneously with the reading device and to indicate to the operator which data belongs to a respective bale, which can be done by displaying a direction identification (arrow) or an image of the inspected bale captured by the camera and associating the read data with the bales on the display device of the reading device in the manner of virtual reality.

In addition, the supply of film can be furnished on the side facing away from the bale with a machine-readable identification that can be used to control an arrangement for wrapping the bale. The arrangement for wrapping the bale can thus detect how much film remains in the supply or can ensure that, after a finished wrapping process, the film is cut off at the correct time before another sensor assembly is wound onto the bale. Since the film may be stretched while wrapping the bale, the printed identification may be compressed in such a manner that it is machine-readable after stretching.

The reading device for transmitting the sensor data from the sensor assembly that has been written to the sensor assembly may include a receiving device for receiving the sensor data, a processor for processing the sensor data, a memory and a display device for displaying the processed sensor data. In particular, the processor can be operated so as to calculate and display properties of the bale, particularly in the core zone of the bale, based on a physical model loaded into the memory and based on the sensor data. For calculating the properties of the bale by means of a captured identification of the bale (e.g., on the basis of a storage device of the sensor assembly or a camera or scanner of the reading device and unique for each bale), the processor can retrieve additional data for the present bale from the memory or from a memory device of the sensor assembly or from a remote server. This may be done, for example, in order to calculate a critical pH value based on the content of dry matter during the pressing process and compare the pH value to a pH value captured by sensors or include the time between the pressing process and the wrapping process in the model calculation.

In another embodiment of this disclosure, a method is provided of storing information corresponding to a baled crop during a baling process. The method includes providing a harvesting machine including a control unit, a sensor, and a bale tag reader; forming the baled crop with a bale tag by the harvesting machine; identifying the baled crop by the control unit with a bale identifier; sensing a characteristic of the baled crop by the sensor; detecting a bale tag identifier associated with the bale tag by the bale tag reader; communicating the characteristic and bale tag identifier to the control unit; corresponding the characteristic, bale tag identifier and bale identifier of the baled crop to one another; and storing the characteristic, bale tag identifier and bale identifier in an electronic storage unit that is in electrical communication with the control unit.

The method may include communicating the characteristic, bale tag identifier and bale identifier to a remote location via a cloud-based network. In one example, the storing step includes storing the characteristic, bale tag identifier and bale identifier in a data server located on the harvesting machine. In a second example, the storing step may include storing the characteristic, bale tag identifier and bale identifier in a data server located remotely from the harvesting machine. Moreover, the method may include storing the characteristic, bale tag identifier and bale identifier in a data matrix, the data matrix including a plurality of columns for the characteristic, bale tag identifier and bale identifier. In addition, the forming step may include forming the baled crop with two or more bale tags coupled thereto, each of the two or more bale tags including a bale tag identifier unique to the respective bale tag; wherein, the plurality of columns in the data matrix includes a column for each bale tag identifier for the baled crop. In a further example, the forming step includes forming a plurality of baled crops with the harvesting machine, each of the plurality of baled crops including at least one bale tag coupled thereto, and each of the at least one bale tag including a bale tag identifier unique to the respective bale tag; and identifying each of the baled crops by the control unit with a bale identifier; wherein, the data matrix includes a plurality of rows, and the bale identifier of each of the plurality of baled crops being stored in one of the plurality of columns and the plurality of rows.

In this embodiment, the method may include electrically coupling the storage unit to a mobile device over a wireless network; and permitting access over the wireless network to the stored characteristic, bale tag identifier and bale identifier via the mobile device. In another example, the sensing step may include sensing at least one of a moisture content, bale size, bale location, and nutritional value of the baled crop. Moreover, the detecting step may include scanning a barcode, quick response code, or RFID chip on the bale tag. The method may further include detecting information related to a carrier material; wrapping the baled crop with the carrier material during the baling process; communicating the information related to the carrier material to the control unit; associating the information related to the carrier material with the characteristic, bale tag identifier and bale identifier; and storing the information related to the carrier material in the storage unit.

In a further embodiment of this disclosure, a communication system is provided for tracking information related to a baled crop formed during a baling process by a harvesting machine. The system includes a control unit for controlling the harvesting machine; a sensing unit mounted to the harvesting machine for detecting a characteristic of the baled crop; a bale tag coupled to the baled crop, the bale tag including a bale tag identifier; a bale tag reader for reading the bale tag identifier on the bale tag; an electronic storage unit disposed in electrical communication with the control unit; a wireless communication network electrically coupling the control unit, the sensing unit, the bale tag reader, and the electronic storage unit to one another; wherein, during the baling process, the control unit assigns a unique bale identifier to each baled crop, and receives a characteristic detected by the sensing unit and the bale tag identifier from the bale tag reader via the wireless communication network; further wherein, the control unit communicates the bale identifier, characteristic, and bale tag identifier to the storage unit via the wireless communication network.

In one example of this embodiment, the electronic storage unit comprises a data server located on the harvesting machine. In a second example, the electronic storage unit comprises a data server located remotely from the harvesting machine. In a third example, the electronic storage unit comprises a memory of the control unit. In a fourth example, the system may include a mobile computing device remotely located from the harvesting machine, the mobile computing device being in electrical communication with the electronic storage device via the wireless communication network to access the characteristic, bale identifier and bale tag identifier. In a fifth example, the system may include a data matrix stored in the electronic storage unit, the data matrix including a plurality of columns and a plurality of rows; wherein, for each baled crop, the characteristic, bale identifier and bale tag identifier of said baled crop is recorded in one of the plurality of rows or columns of the data matrix. In a further example, the system may include a second bale tag coupled to the baled crop, the second bale tag including a second bale tag identifier coupled thereto, wherein the bale tag reader communicates the second bale tag identifier to the control unit, and the control unit associates the first bale tag identifier and the second bale tag identifier with the characteristic and bale identifier. Moreover, the system may include a carrier material fastened to the baled crop during the baling process, the carrier material including a carrier material identifier; wherein, the carrier material identifier is communicated to the control unit and associated with the bale identifier, bale tag identifier, and characteristic of the baled crop.

In yet a further embodiment of the present disclosure, a communication system is provided for storing information related to a baled crop formed during a baling process by a harvesting machine. The system includes a control unit for controlling the harvesting machine; a plurality of sensors mounted to the harvesting machine for detecting a plurality of characteristics of the baled crop; a carrier material fastened to the baled crop during the baling process, the carrier material including a carrier material identifier; a bale tag coupled to the carrier material, the bale tag including a bale tag identifier; a bale tag reader for reading the bale tag identifier on the bale tag; an electronic storage unit disposed in electrical communication with the control unit; a wireless communication network electrically coupling the control unit, the plurality of sensors, the bale tag reader, and the electronic storage unit to one another; wherein, during the baling process, the control unit assigns a unique bale identifier to the baled crop, and receives the plurality of characteristics detected by the plurality of sensors and the bale tag identifier from the bale tag reader via the wireless communication network; wherein, the control unit communicates the bale identifier, the plurality of characteristics, and bale tag identifier to the storage unit via the wireless communication network; further wherein, the wireless communication network is adapted to electrically couple a mobile computing device to the electronic storage unit to allow access from a remote location to the bale identifier, the plurality of characteristics, and bale tag identifier.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein:

FIG. 2 is a side view of a partially unwound reel with film for wrapping the bale;

FIG. 3 is a side view of a bale wrapped with film;

FIG. 4 is a schematic view of a reading device;

FIG. 5 is a schematic representation of a server to which the reading device can establish a connection;

FIG. 12 is a schematic view of a data log of parameters detected and associated to baled crop.

DETAILED DISCLOSURE

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

A baled crop may be formed in a square or round baler and composed of organic material such as silage or hay. The baled crop may be desirably stored in the absence of air. For this purpose, it is conventional to use a so-called bale wrapper that is mounted together with a square or round baler on a common chassis or which picks up a bale along with netting or twine from the field as a separate machine and wraps it with film. Due to wrapping the baled crop with film, a farmer cannot monitor the quality of the bale without destroying the film. For assessing the storage life, usability and value of the baled crop during storage, a sensor-based quality assessment may be used to monitor the quality of the crop. An end user, such as a farmer, may be interested in different quality information about a given crop. For example, if the silage formation process is incomplete or atmospheric oxygen enters (due to damage to the film) there is potential risk of post-heating or hot fermentation in which the bale warms up and the proteins are damaged. Moreover, at pH values above a critical pH value (typically a pH value of approximately 4.5) microbes harmful to health can arise. The content of dry matter may influence the critical pH value (with increasing dry matter content, the critical pH value increases). Also, tightly pressed bales may yield a higher silage quality.

In view of this, attaching electronic identification means on which data characterizing the bale, such as moisture, place of origin, etc., can be stored in or on a bale. Alternatively, the data or information may be stored on the baler for purposes of precision agriculture or in order to be able to locate the bale subsequently. In many applications, however, subsequent changes of the properties of the baled crop cannot be detected by these conventional procedures. In this disclosure, different systems and methods provide alternative means for identifying and tracking data or information about a baled crop.

Figure 1:
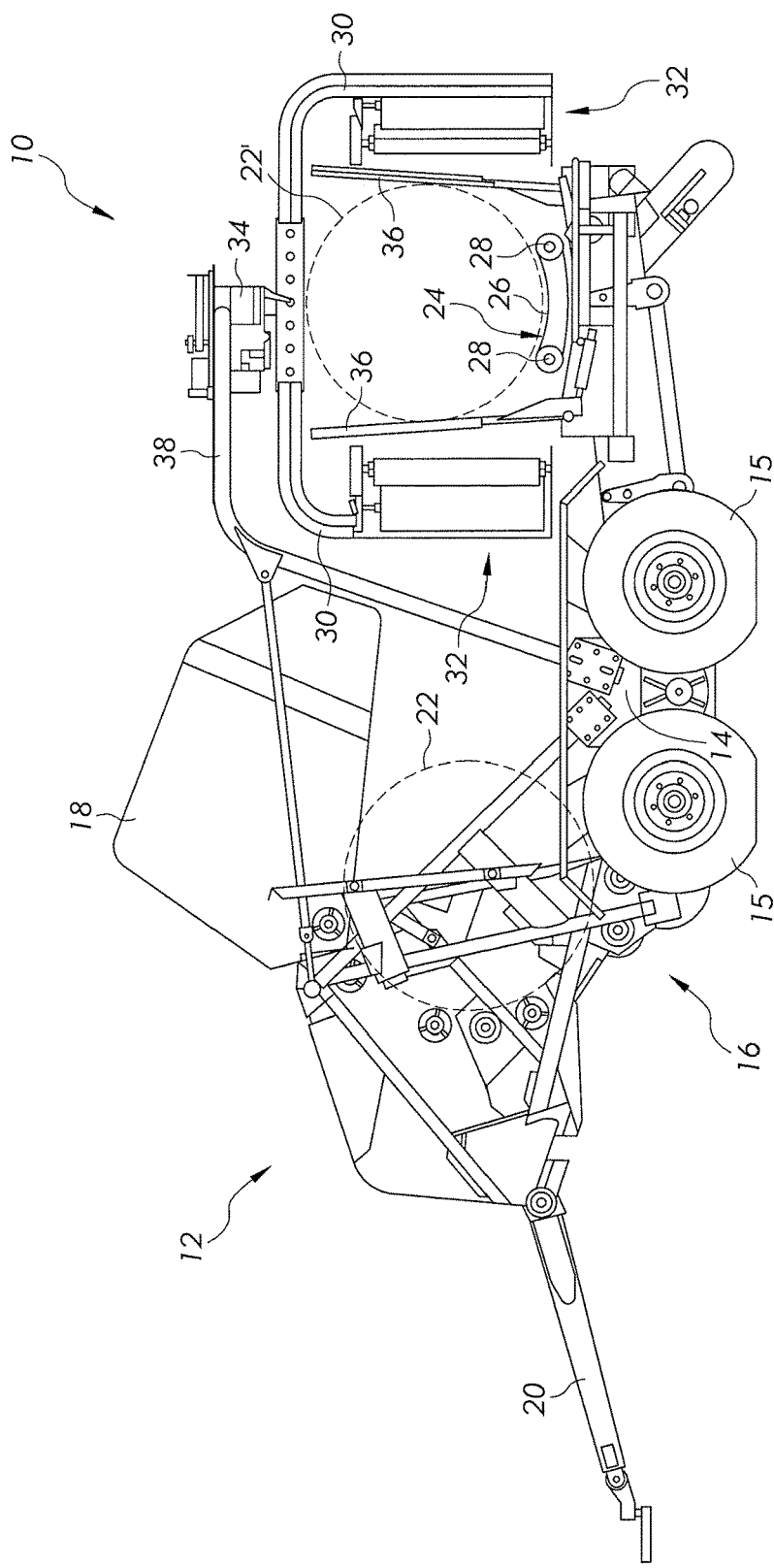
FIG. 1 is a schematic side view of a combination of a baler and a bale wrapper.

Referring to FIG. 1, a plan view of a combination 12 of a baler 16 and a bale wrapper 10 is shown. The baler 16 may be a square baler, a round baler, or harvesting machine used as an arrangement for pressing organic material into a bale. The bale wrapper may be used as an arrangement for wrapping organic material pressed into a bale with a film for airtight storage. The combination 12 is constructed on a frame 14 that is supported on the ground by wheels or other known ground-engaging mechanisms 15. The baler 16 includes a rear door 18.

The combination 12 is towed in operation via a drawbar 20 behind a traction vehicle (not shown) such as a tractor or other work machine. In an alternative embodiment, a baler 16 and a separate bale wrapper that are towed by associated traction vehicles across a field may be used for carrying out the principles and teachings of this disclosure. Moreover, the combination 12, or the baler 16 or bale wrapper 10, may also be self-propelled.

A bale 22 produced in the baler 16 is brought by a movable table 24 from the baler 16 into a wrapping position in the bale wrapper 10. During the wrapping operation, the bale 22' to be wrapped is therefore on the table 24, which includes a belt 26 that rolls about two rollers 28. Above the table 24 are two diametrically opposed arms 30 with vertical and horizontal portions perpendicular to one another that rotate around the bale 22'. Each vertical portion of the arms 30 holds a film dispenser 32. The central ends of the horizontal portions of the arms 30 are connected to a drive arrangement 34 designed to rotate the arms 30 about a central vertical axis. The drive arrangement 34 is connected by a carrier frame 38 to the frame 14 and includes a hydraulic motor connected to the hydraulic system of the traction vehicle. During the wrapping operation, the drive arrangement 34 or a separate hydraulic motor also drives the rollers 28 so that the bale 22' rotates about its horizontal axis while the arms 30 rotate about the bale 22' and film is unwound from the film dispensers 32 and wrapped around the bale 22'. Film holders 36 press the film during the start of the wrapping operations against the bale 22' and cut the film after wrapping. The speeds of the arms 30 and the rollers 28 can be synchronized in order to achieve a desired positioning of the film on the bale 22'.

Referring now to FIG. 2, a reel 40 of film 56 is shown mounted on one (or both) of the film dispensers 32 in order to wrap the bale. The film 56 includes a carrier material 48, on which sensor assemblies 42 having a sensor 46 for detecting properties of the material in the bale and an electromagnetic transmitting device 44 connected to the sensor 46 in order to transmit the sensor data are applied during manufacturing with a defined spacing to the inner side of the film (i.e. on the side coming into contact with the bale 22'). The sensor assemblies 42 can, in particular, be RFID chips, which are also available with integrated sensors 46.

On the opposite side of the carrier material 48, visible markings 50, which facilitate finding the sensor assemblies 46, are printed during manufacturing on the film 56 at locations where sensor assemblies 42 are mounted on the inner side. On the basis of the marking 50, a short range reading device 54 (FIG. 4) can be brought into the vicinity of the sensor assembly 42 to read the data from the sensor assembly 42. In addition, machine-readable identifiers 52, which contain information regarding the film 56 that can be used for controlling the bale wrapper 10, for example, are applied to the outer side of the carrier material 48. These visual identifiers 52 can be designed to be machine-readable in the form of a one-dimensional or two-dimensional bar code (linear bar code, quick response (QR) code, etc.). The sensor assemblies 42 may be applied to the outer side of the carrier material 48, and the identifiers 52 and markings 50 to the inner side, particularly if the outer side of the carrier material 48 were to come into contact with the bale 22'.

Stretchable film 56, which is pre-stretched during application to the bale 22, may be used for wrapping bales 22 composed of silage and haylage. This pre-stretching may be between 50% to 70%. The electronic sensor assemblies 42 applied to the film 56 are integrated in stretchable film 56 in such a manner that they do not change to a particular extent during elongation of the film 56 in the longitudinal direction of the film structure and also are not damaged. It is also necessary to take care during application or printing of the machine-readable identifiers 52 on the stretchable film 56 so that they are readable both before and after stretching of the film 56. A compression of the identifiers 52 in the unstretched state may therefore be necessary.

In FIG. 3, a bale 22 is shown that has been wrapped with film 56. A sensor assembly 42, and in particular the sensor 46, is situated in contact with the surface of the material of the bale 22 and is on the side of the film 56 that faces the bale 22. The sensor 46 can detect properties of the material of the bale 22, e.g., temperature, moisture content, pressure or conductivity, and transmit corresponding signals to the transmitting device 44.

The reading device 54, as shown in FIG. 4, may include a receiving device 60 for receiving sensor data transmitted by the transmitting device 44 of the sensor 46, a processor 62 for processing the sensor data, a memory 64, and a display device 66 for displaying the processed sensor data. The device 54 enables the display of sensor data on the display device 66, directly or after further processing. If necessary, the reading device 54 (designed in particular as a handheld device such as a smart phone, tablet computer or laptop) can query additional data via a transmission device 56 and an antenna 58 from a server 72, which communicates via an associated transmitting device and an antenna 70 with the transmitting device 56 via any desired protocol (e.g., a protocol for wireless telephony or an Internet protocol) and is located at a remote location 68. The power for the transmitting device 44 and, if necessary, the sensor 46 of the sensor assembly 42 can be supplied wirelessly via the reading device 54.

The sensor 46 measures parameters such as temperature, moisture content, pressure and conductivity of the crop material in the peripheral zone 74 of the bale 22. This information is read via the receiving device 60 of the reading device 54 and transferred to the processor 62. The reading device 54 is equipped with a display device 66 for displaying the relevant quality and storage parameters of the bale 22. The processor 62 is programmed, based on a physical model previously loaded into the memory 64 (as a program, a table, a database or the like) and, based on the data from the sensor 46, to determine or make calculations regarding the bale properties (e.g., in the core zone 76 of the bale 22). For these calculations, additional data for the bale 22 can be retrieved from the memory 64 or the server 72 by means of identification data for the bale 22, which can be stored in a memory of the sensor assembly 42. This data can be stored directly in the memory of the sensor assembly 42.

In one example, the content of dry matter during the pressing process may be detected and stored since it defines the critical pH value. By means of the sensor 46 (e.g. based on a measurement of the electrical conductivity), the current pH value can thus be determined and compared to the critical pH value. For grass silage, the time between the pressing process and the wrapping process may influence the silage quality. In at least one aspect, the desired time is less than two hours. This information, for example, can also be included in the model calculation.

Alongside the values detected directly by the sensor 46, it is also possible by means of the described calculation based on the model to calculate and display the corresponding values in the core zone 76, as well as the current pH value, the critical pH value, the content of dry matter, an appropriate consumption date or pressing density. Information regarding the status of the bale (i.e. whether or not it can still be used) can also be determined, and a warning can be issued in the event of hot fermentation. This data can be transmitted by the reading device 54 to the server 72 so that the owner of the bales 22 can retrieve the appropriate information there.

Figure 6:
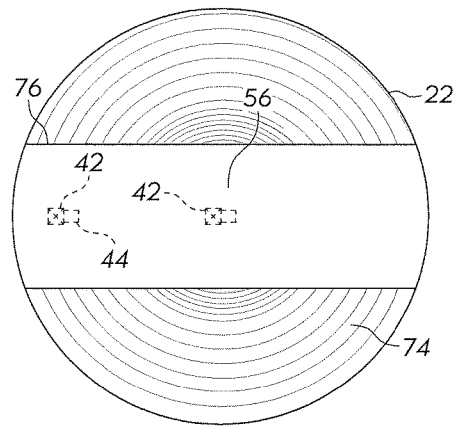
FIG. 6 is a plan view of a bale partially wrapped with a first embodiment of a film.
Figure 7:
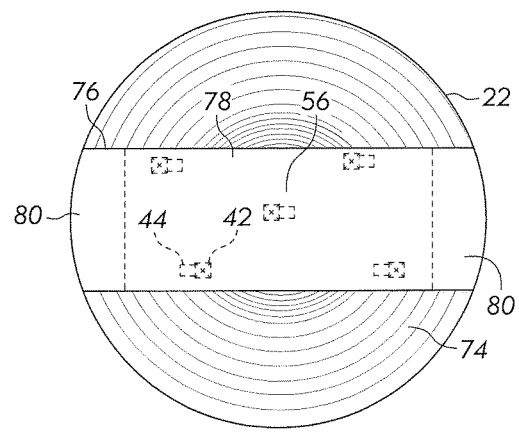
FIG. 7 is a plan view of a bale partially wrapped with a second embodiment of a film.

Referring to FIGS. 6 and 7, two additional possible embodiments are shown for applying the film 56 to the bale 22. While the carrier material 48 in the embodiment shown in FIG. 3 covers the outer surface of the cylindrical bale 22 (i.e. the film 56 is not wound around the bale 22 by the bale wrapper 10, but rather by the baler 16 of FIG. 1), the bale 22 is wrapped according to FIGS. 6 and 7 alternately perpendicular and parallel to the axis of the cylinder for which the bale wrapper 10 of FIG. 1 is used. The sensor assembly 42 is also or exclusively applied laterally to the bale 22, i.e., on the end face thereof.

FIG. 6 additionally illustrates the film 56 enveloping the bale 22 and consists of different areas with different material properties. Thus, under certain circumstances it may be desirable to use a less elastic material 78 as the carrier material 48 for applying the sensor assemblies 42, and to use a more stretchable material 80, connected to the material 78, for the actual enveloping of the bale 22.

In the embodiment of FIG. 7, the wrapped bales 22 may be wound with 4 to 8 plies. It is therefore possible to use two different materials 78, 80 for the film 56. One difficulty that arises from the use of two different materials 78, 80 (on one reel 40) for winding the bale 22 is that the material length for a bale 22 is defined by the reel 40 composed of alternating inelastic carrier material 78 and stretchable stretch film 80 that is inserted into the bale wrapper 10. The machine-readable identifiers 52 and a corresponding reading device on the bale wrapper 10 can be used to detect the type or running length of the film 56, in order to actuate the drive arrangement 34 and the film holders 36 appropriately and ensure that each bale 22 is wound with at least one sensor assembly 42.

Figure 8:
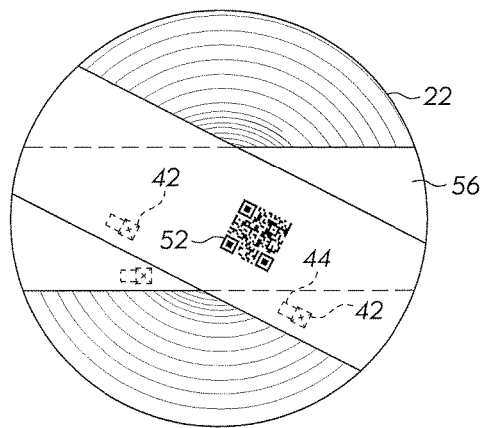
FIG. 8 is a plan view of a bale partially wrapped with a third embodiment of a film.

If sensor assemblies 42 end up in outer layers of the film 56, for example, because the carrier material 48 is uniformly and continuously equipped with sensor assemblies 42, it is expedient if the sensor assemblies 42 detect whether they are located between two layers of the carrier material 48 and therefore have no direct contact with the crop material. In such cases, the data from the affected sensor assemblies 42 may not be evaluated. Such an arrangement may be desirable if the unit costs for the sensor assemblies 42 is low. For a carrier material 48 equipped with numerous sensor assemblies 42, it may be advantageous to arrange the sensor assemblies 42 at the edge of the carrier material 48, as shown in FIG. 8, because there is a higher degree of overlapping in the central area of the carrier material 48.

Referring now to FIGS. 9-12, a further aspect of the present disclosure is disclosed. In FIG. 9A, large square baler 912 may be towed across a field by agricultural vehicle 910. (It will be understood that various other configurations are also possible, For example, the disclosed sensor assembly and method may be utilized with a variety of balers or other equipment.) Baler 912 may include housing 914, which may generally shield various internal components of baler 912. As baler 912 moves across a field (e.g., as towed by vehicle 910 via connection 910a) and encounters a windrow or other arrangement of material (not shown), pick-up assembly 916 may gather the material and move it up and into housing 914 for processing. As a result of this processing, as described in greater detail below, bale 918 may be formed and may be ejected from the rear of baler 912.

Figure 9A:
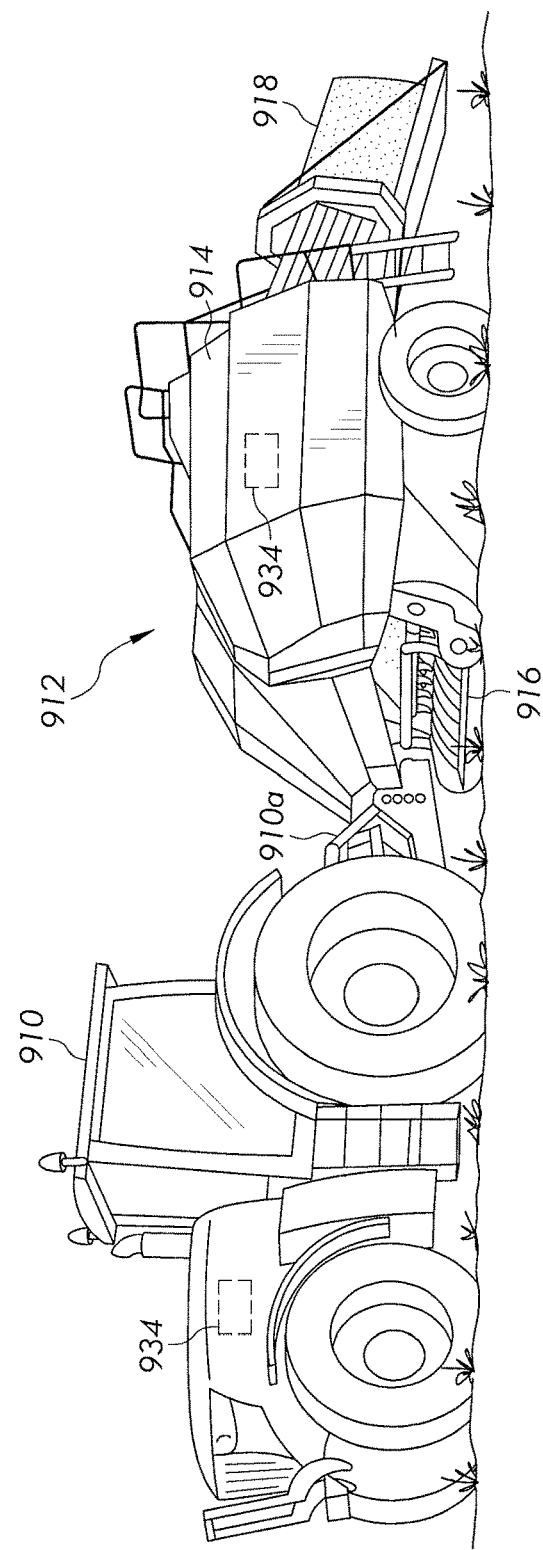
FIG. 9A is a perspective view of a second embodiment of a baler towed by an agricultural vehicle.

In various embodiments, baler 912 (or vehicle 910) may include one or more computing devices, such as controller 934. Various alternative locations for controller 934 are depicted in FIG. 9A, including locations on vehicle 910 and baler 912. It will be understood that one or more controllers 934 may be employed and that controller 934 may be mounted at various locations on vehicle 910, baler 912, or elsewhere. Controller 934 may be a hardware, software, or hardware and software computing device, and may be configured to execute various computational and control functionality with respect to baler 912 (or vehicle 910). As such, controller 934 may be in electronic or other communication with various components and devices of baler 912 (or vehicle 910). For example, controller 934 within baler 912 may be in electronic communication with various actuators, sensors, and other devices within (or outside of) baler 912. Controller 934 may communicate with various other components (including other controllers) in various known ways, including wirelessly. The baler 912 and related embodiments thereto are further described in U.S. Publication Ser. No. 2015/0208586, the disclosure of which is hereby incorporated by reference.

Figure 9B:
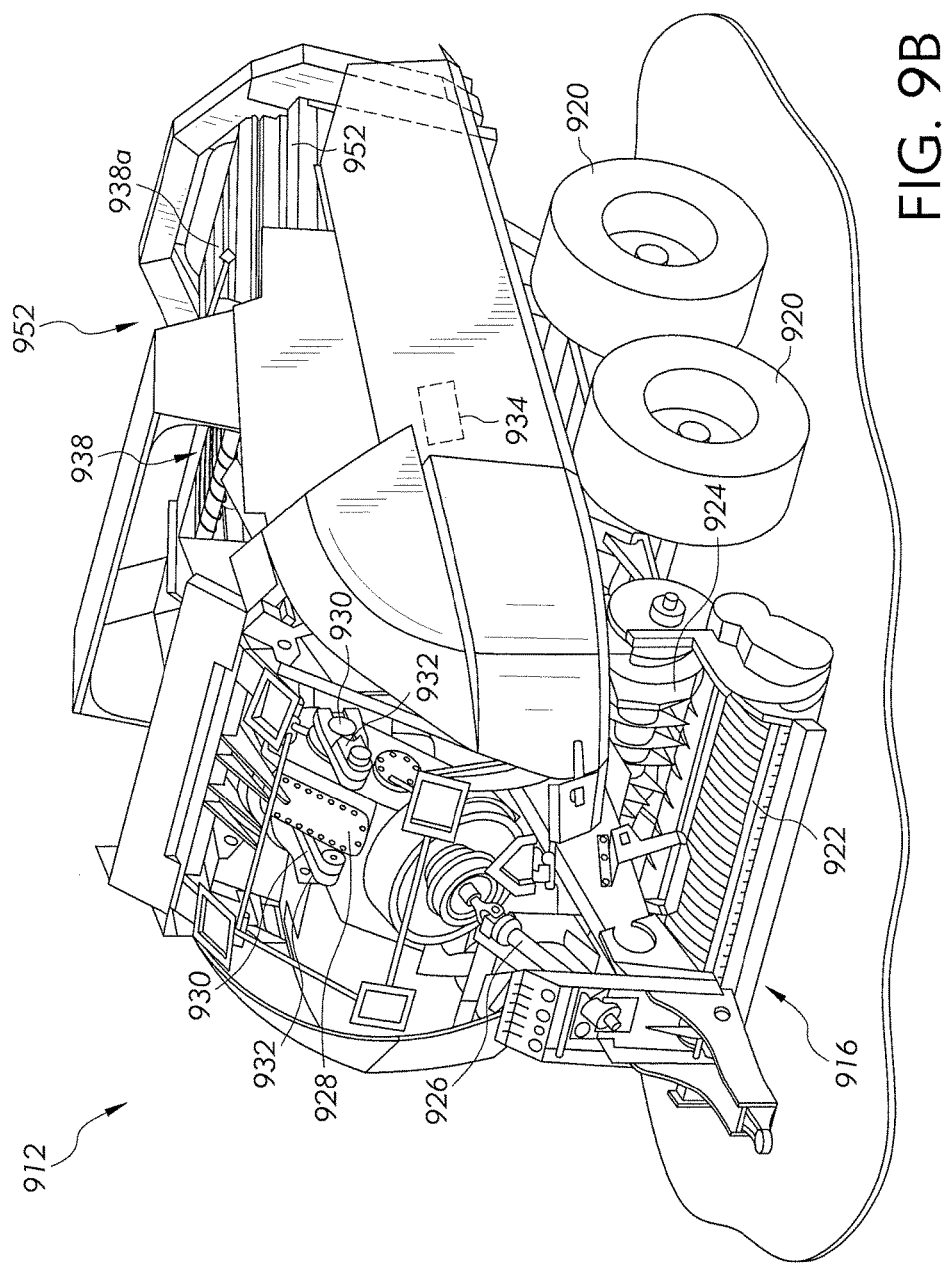
FIG. 9B is a perspective view of the baler of FIG. 9, which portions of the cover of the baler removed.

Referring now also to FIG. 9B, various internal components of an example configuration of baler 912 are depicted. It will be understood that various other configurations may also be possible. Pick-up assembly 916, for example, may include rotary tine pick-up 922 for gathering crop material from windrow (not shown). Material gathered by rotary tine pick-up 922 may be routed to feed auger 924, which may further direct the material toward baling chamber 938 for compaction into a baler.

Baling chamber 938, which is depicted with upper panel 938a in place, may be a chamber of generally rectangular cross section extending axially along baler 912 in a generally front-to-back direction. Chamber 938 may be configured in various ways to receive material gathered by pick-up assembly 916, hold the material for compaction, then release the resulting bale from the back (or other portion) of baler 912 (e.g., as depicted for bale 918, in FIG. 9A).

Baling chamber 938 may be bounded on one or more sides (e.g., to the right and left, from the perspective of the forward direction of baler 912) by tension panels 952, which may be movable in order to control various aspects of a baling operation. For example, various actuators (not shown) may be mounted to baler 912 and one or more of tension panels 952 such that the actuators may cause tension panels 952 to vary the cross-sectional area of baling chamber 938. In certain embodiments, for example, hydraulic pistons (not shown) may be configured to pivot tension panels 952 into (or out of) baling chamber 938, in order to decrease (or increase) the cross-sectional area of chamber 938 and thereby increase (or decrease) the force required to push a given amount of compacted crop material through chamber 938 (e.g., the pressure required for plunger 954 to move the bale through chamber 938). In this way, for example, tension panels 952 may be utilized to vary the density of the resulting bale 918.

Compaction of crop material within baling chamber 938 may be driven in various ways. For example, as depicted in the various figures, plunger 954 (not shown in FIG. 9B) may be driven by a crank arm assembly. As depicted in FIG. 9B, power take off ("PTO") connection shaft 926 may be configured to receive rotational power from PTO shaft of vehicle 910 (e.g., via connection 910a, as shown in FIG. 9A). In certain embodiments, accordingly, whenever the PTO output of vehicle 910 is engaged, PTO connection shaft 926 may be receiving rotational power from vehicle 910. (It will be understood that various other configurations are also possible, such as configurations in which shaft 926 (or various other components of baler 912) may be selectively disengaged even if the PTO output of vehicle 910 is engaged.)

In various embodiments, PTO connection shaft 926 may provide rotational power to gear box 928. Through one or more internal gears (not shown in FIG. 9B), this power may be routed through gear box 928 to crank arms 930, which may be connected to plunger 954 via connecting rod(s) 932. (Connecting rods 932 have been partially removed in FIG. 9B, for clarity of presentation.) In this way, rotational power may be provided from vehicle 910 to crank arms 930. Crank arms 930, accordingly, may then drive the reciprocating motion of plunger 954, via connecting rod(s) 932, in order to compact material within baling chamber 938 into formed bales 918. It will be understood that various other configurations may be possible. For example, in certain embodiments, gear box 928 may be powered by an electrical or hydraulic machine rather than by direct mechanical power from a PTO interface.

In various embodiments, rotation of PTO connection shaft 926 (e.g., as powered by the PTO output of vehicle 910) may additionally (or alternatively) provide rotational power to various components of baler 912. For example, the motion of various components of pick-up assembly 916, various tying mechanisms (not shown), pumps for hydraulic actuation of tension panels 938 (not shown), and so on, may be driven via power connections of various known types (e.g., chain or belt drives) to PTO connection shaft 26 or associated components.

A twine tying arrangement (not shown) may be provided for wrapping and tying multiple loops of twine about a completed bale. The bale tying cycle may be initiated by a bale length sensor arrangement (not shown) including a toothed metering wheel (not shown) mounted on a shaft (not shown) extending horizontally across and being rotatably mounted to the top of the baling chamber 938. The metering wheel may have a toothed periphery which extends into the baling chamber 938 and is contacted by a forming bale so as to be rotated as the bale grows in length. The rotation of the metering wheel is sensed and converted into a signal representing bale length, with a control signal being sent to initiate the tying cycle when the forming bale reaches a length corresponding to a desired bale length. An example of a twine tensioner or knotter system is described in U.S. Pat. No. 8,617,834 to Deere & Company, the disclosure of which is hereby incorporated by reference.

As the baled crop is formed in the baler 912, certain parameters or qualities of the crop may be measured or determined, e.g., moisture quality, baling time, bale weight, bale length, etc. This is further described with respect to FIGS. 11 and 12. In any event, the ability to trace or track baling parameters can be useful to an end user. Baled products, such as hay or silage, may be fed to livestock, and the quality of the feed may be important to the diet of the livestock. To achieve this traceability of the baled product, a tagging system may be employed for storing or otherwise retaining the parameters or quality of the crop. For example, a higher quality feed may be fed to certain livestock, whereas feed with lesser quality may go to a different type of livestock (e.g., dairy cow versus a dry cow).

In the organic food industry, for example, traceability of feed quality is desired. Many in the industry want to know where food products (such as milk) come from, what the livestock ate while it was being raised, etc. As a result, the tagging system may be employed in the baling process to provide this type of information to the consumer.

Figure 10:
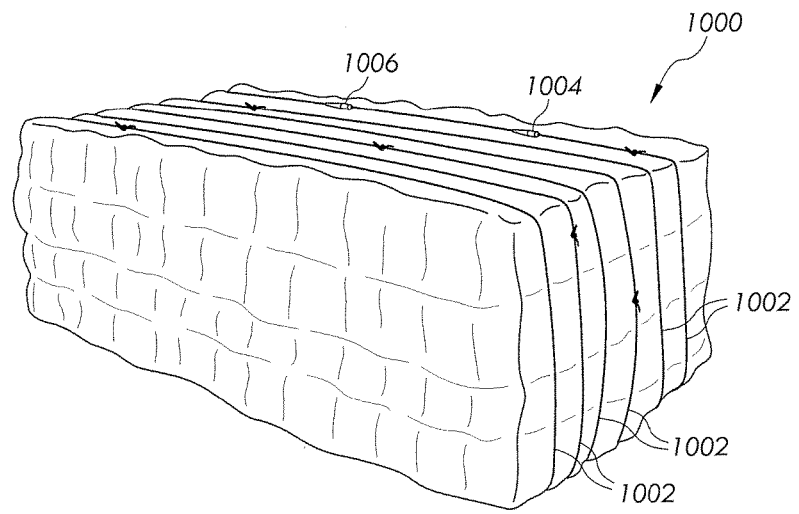
FIG. 10 is a perspective view of a baled crop with bale tags coupled thereto.

An example of the tagging system is shown in FIG. 10 of the present disclosure. In this example, a bale of hay 1000 is shown formed in a rectangular shape with twine 1002 wrapped around and fastened about the crop. As described above with respect to FIGS. 9A and 9B, the hay may be picked up by the baler 100, fed through the baler via a baling process and extruded out the rear end thereof. During the baling process and once the bale 1000 is formed, the twine 1002 may be fastened or tied along the length of the crop in a conventional manner. As shown, there may be one or more pieces of twine 1002 coupled thereto.

As also shown, a first bale tag 1004 and a second bale tag 1006 may be coupled to the twine 1002 at different locations along the length thereof. Each bale tag may be coupled to the twine either before or after the twine is fastened to the baled crop. Moreover, each bale tag may include a radio-frequency identification (RFID) chip or other technology coupled thereto that provides a unique means for identifying the tag relative to other bale tags. In other words, each bale tag may include a different identifier (e.g., alphanumeric identifier, numeric identifier, etc.). In other embodiments, the bale tags coupled to each baled crop may include the same identifier, but the identifier is different compared to bale tags coupled to different baled crops. While in FIG. 10 there are two bale tags shown coupled to the twine 1002, in at least one other embodiment only one bale tag may be coupled to the twine 1002. Thus, there may be one or more bale tags coupled to and associated with a baled crop.

The manner or timing in which the bale tag is coupled to the twine 1002 is non-limiting. In one example, the bale tag may be coupled to the twine 1002 during the baling process, e.g., after the twine 1002 is fastened to the baled crop 1000. Alternatively, the bale tag may be coupled to the twine 1002 in advance or before the baling process. For example, the bale tag may be coupled to the twine 1002 by the twine manufacturer. Thus, in this example only, the supply of twine to the baler 100 may already include bale tags coupled thereto.

As described, each bale tag may include a RFID chip and antenna for transmitting signals to a remote location. Other technology may be incorporated in the bale tag including, but not limited to, a visual identification such as a barcode, a quick response (QR) code, or any other visual identifier known to the skilled artisan. In any event, the bale tag includes a readable identifier that corresponds to the bale tag and may be detected by a bale tag reader, as described herein. In at least one embodiment, the bale tag is not writable. In other words, the bale tag includes a unique identifier associated only to that bale tag that is readable by a machine or reader, but the machine or reader cannot write data or other information to the bale tag.

The read-only bale tag allows flexibility over other conventional means. A user may wirelessly scan the tag via a scanning device, or scan the tag with a mobile device (i.e., scan a barcode or QR code according to known methods). In doing so, this enables a user to collect or associate data related to the baled crop via use of the bale tag. This is further described with respect to FIG. 11.

Figure 11:
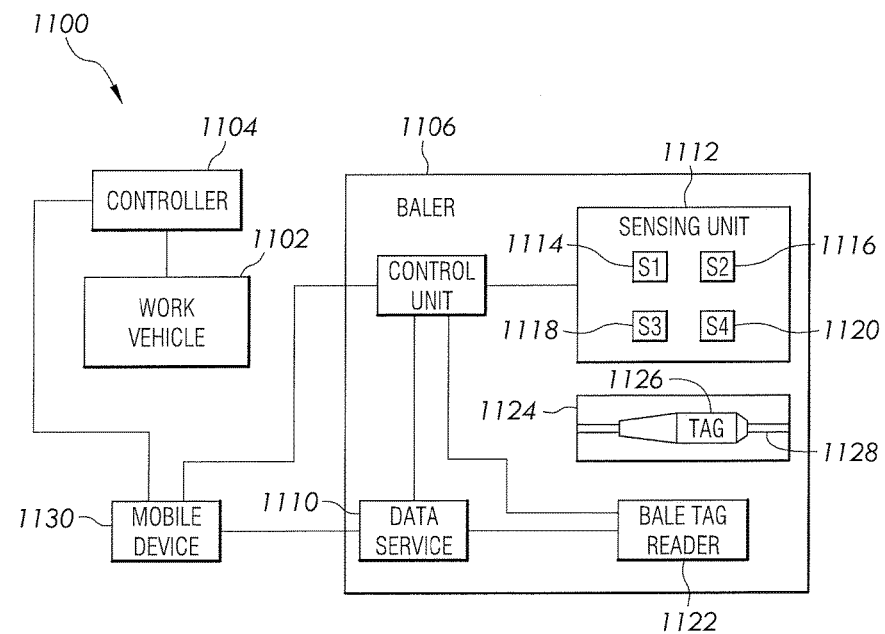
FIG. 11 is a schematic control system for tagging and identifying baled crop.

Turning to FIG. 11, a control system 1100 is shown for managing a database of information for identifying and tracking information about a baled crop formed during a baling process. This control system 1100 may utilize wireless technology including Wi-Fi and cloud-based technology for the collection, transfer, and tracking of information related to the baled crop. However, in other embodiments, other communication technology such as cellular communication may be used for the transmission and receipt of information. Thus, the manner in which information is collected, communicated, and stored may vary based on the type of embodiment.

In FIG. 11, the control system 1100 may include a work machine 1102 such as a tractor or vehicle that is coupled to and pulls a harvesting machine 1106 such as a baler. The harvesting machine or baler may include any of the features described above in FIGS. 1 and 9, or it may include any other known type of harvesting machine. Thus, the type of harvesting machine may vary. For purposes of this embodiment, however, the harvesting machine is described as a baler 1106. The work machine 1102 may include its own controller 1104 for controlling the operation of the machine. Similarly, the baler 1106 may include its own control unit 1108 for controlling operation of the baler 1106.

The controller 1104 and control unit 1108 may each include a memory unit and processor. The memory unit may store algorithms, software, look-up tables, etc. for aiding in the operation of the work machine or baler. Moreover, the processor may execute instructions stored in the memory for controlling the work machine or baler. As shown in FIG. 11, the controller 1104 and control unit 1108 may be in electrical communication with one another. In at least one aspect, the electrical communication between the controller 1104 and control unit is wireless via any known type of wireless technology. As such, the controller 1104 and control unit 1108 may communicate with one another as necessary for controlling the work machine 1102 and baler 1106.

In addition to the control unit 1108, the baler 1106 may also include a data server 1110. The data server 1110 may be in electrical communication with the control unit 1108. The server 1110 may provide a local storage unit for storing data, information, and the like as collected by the baler 1106. As shown, the baler 1106 may include a sensing unit 1112. The sensing unit 1112 may include a plurality of sensors or other detection-based means for detecting or measuring data about a baled crop formed by the baler 1106. In this embodiment, the sensing unit 1112 may include a first sensor 1114, a second sensor 1116, a third sensor 1118, and a fourth sensor 1120. In other embodiments, the sensor unit 1112 may include any number of sensors.

The sensing unit 1112 may be mounted inside the baler, such as the baling chamber, to measure and record data related to a baled crop 1124. In FIG. 11, the baled crop 1124 may include at least one piece of twine 1128 fastened thereto, and a bale tag 1126 is coupled to the twine 1128. The bale tag 1126 may be read by a bale tag reader 1122, as shown in FIG. 11. The bale tag reader 1122 may be a RFID reader, a barcode reader, a QR code reader, or any other known reading device. The bale tag reader 1122 may be mounted to the baler 1106 in a location downstream from where the twine 1128 and bale tag 1126 are coupled to the baled crop 1124. In other embodiments, however, the bale tag reader 1122 may be located upstream from where the twine 1128 and bale tag 1126 are coupled to the baled crop 1124. In one example, the bale tag reader 1122 may read the bale tag 1126 before the bale tag 1126 is assembled to the twine 1128. In another example, the bale tag reader 1122 may read the bale tag 1126 after the bale tag 1126 is assembled to the twine 1128, but before the twine 1128 is tied to the baled crop 1124. In yet a further example, the bale tag reader 1122 may read the bale tag 1126 after the bale tag 1126 is assembled to the twine 1128 and after the twine 1128 is tied to the baled crop 1124. Other configurations may be possible as well.

In FIG. 11, the control unit 1108 is disposed in electrical communication with the sensing unit 1112 and the bale tag reader 1122. In one example, the control unit 1108 may be in electrical communication with each of the plurality of sensors directly or via a communication bus. Thus, the bale tag reader 1122 can detect or read the unique identifier associated with the bale tag 1126 and communicate the identifier to the control unit 1108. In addition, or alternatively, the bale tag reader 1126 may be in electrical communication with the data server 1110, and thus it may communicate the identifier to the data server 1110. As such, at least one of the control unit 1108 or data server 1110 can store the identifier associated with the bale tag 1126. Moreover, the control unit 1108 or data server 1110 may wirelessly communicate, e.g., via cloud-based technology, the identifier to a remote location such as a mobile device 1130 or remote server (not shown). This allows a user to receive the bale tag identifier from the user's mobile device 1130.

As described, the sensor unit 1112 is capable of detecting or measuring a plurality of different characteristics of a harvested produce and the production of the baled crop 1124. These parameters may include, but are not limited to, a moisture content of the harvested produce, a dry mass content of the harvested produce, bale weight, and bale length, width or diameter. Other information may characterize the suitability of the harvested produce as fodder including protein content, acid detergent fiber (ADF), neutral detergent fiber (NDF). Other information may include a global positioning sensor (GPS) position at a start or end of the baling or wrapping process, date, and time. A sensor may also detect machine status such as start of baling process, end of baling process, start of wrapping process, end of wrapping process, ejection of baled crop, etc. Another GPS may detect an area of collected harvested produce, position of a completed bale, position of bale storage after the baling process, a type of harvested produce, compressed density, silage-making agents used (type, quantity, etc.), use of cutting blades (none, one set, two blade sets, etc.) for determining size of the stems of material inside the bale, a carrier material used for forming (e.g., mesh), a carrier material used for wrapping (e.g., twine, film), manufacturer of carrier material (e.g., twine manufacturer), shelf life (UV resistance of film, quality of harvested produce for baling process), and any other type of characteristic that may be measured or detected by the sensor unit 1112.

If twine is used as the carrier material and fastened to the bale during the baling process, the twine may come supplied in a roll and inserted into the harvesting machine or baler. As such, information about the twine may be detected and communicated to the control unit 1108, data server 1110, or other database (not shown). Information may include an identification number associated with the twine, the type of consumable material, date of manufacture of the twine, compatible machine (e.g., John Deere C440R), roll size (e.g., diameter, length, width, weight), recommended application (e.g., six layers with 50% overlap), serial number of the roll, and position or location of the twine. The twine may be supplied with a visual identifier such as a barcode or QR code, or include an integrated RFID transponder similar to the bale tag. The bale tag reader 1122 or other reading device on the baler may be able to detect the identifier or otherwise scan and transmit the information about the twine to the control unit 1108, server 1110, etc.

In one embodiment, the harvesting machine or baler 100 may perform a baling process. During the baling process, hay or other material may be collected by the baler and formed into a bale as described above with reference to FIGS. 1 and 9A-B. As the bale is formed, the sensor unit 1112 can detect or measure various characteristics about the bale. In the baling chamber, for example, a moisture sensor can measure an electrical resistance or capacitance of the bale for detecting its moisture content. Another sensor can measure the length of the bale. Each characteristic or parameter that is measured may be done so by one or more sensors of the sensor unit 1112. Each measurement may be communicated to the control unit 1108 for recording. The control unit 1108 may communicate the detected measurement to the data server 1110 or other database for storage. The measurements may be stored locally via the data server 1110 or wirelessly communicated via a mobile device 1130 to a remote location over the cloud-based technology.

When each bale is formed, the control unit 1108 may assign an identification number to the bale. This identification number is unique to all other bales formed. In addition, the identification number assigned to each bale may be different from the identification associated with the one or more bale tags coupled to the bale via the twine. Thus, as the bale is formed and the control unit 1108 associated an identification number to the bale, the bale tag reader 1122 reads the one or more bale tags 1126 and communicates the tag identification number to the control unit 1108 or data server 1110. Moreover, the sensor unit 1112 or each sensor may communicate measurements and other data detected to the control unit 1108. The control unit 1108 can therefore associate the measurements with the bale identification number and bale tag identification number. Alternatively or in addition, the control unit 1108 may communicate the measurements from the sensing unit 1112 or each sensor, the bale identification number, and the bale tag identification number (when communicated via the bale tag reader 1122) to the data server 1110 or database.

Referring to FIG. 12 of this disclosure, a data matrix 1200 or spreadsheet is illustrated. As shown, the data collected or recorded may be stored in an organized format so that it may be retrieved at a later time. For example, a user of a mobile device 1130 may access the data wirelessly via Wi-Fi, cloud-based technology or any other known communication means by accessing the server 1110 or database where the information is stored. In this manner, the data associated with any baled crop may be tracked from a remote location at any given time.

As shown in FIG. 12, the data matrix 1200 may include a plurality of columns and rows of characteristics or parameters related to a formed bale. The plurality of columns may include the bale identification number, a first bale tag identification number, a second bale tag identification number, a first measured parameter, a second measured parameter, a third measured parameter, and a fourth measured parameter. There may be any number of columns and rows in the data matrix based on the number of bales formed, number of tags coupled to each bale, and the number of measurements taken or parameters stored for each bale. As shown, each bale may include one or more tags and therefore one or more tag identification numbers may be associated with any given bale. Even when more than one bale tag is coupled to a bale, the control unit 1108 is able to correlate the bale identification number and measured parameters associated with the bale to the one or more bale tag identification numbers.

In the event information about the twine is collected by the control unit 1108, the data matrix 1200 may include one or more parameters corresponding to information about the roll of twine. When a carrier material other than twine is used, data may be collected for the carrier material and associated with the formed bale according to the methods described herein.

While the previously described embodiments refer to wireless communication, other embodiments of this disclosure may utilize the communication of the different parameters and identification numbers via any known wireless or wired communication. In addition, data storage may be achieved locally by the memory in the control unit 1108 or the data server 1110. Alternatively, the control unit 1108 may communicate the information to the controller 1104 and stored on the work machine 1102. Further, information may be stored in a separate hard drive, database or server on the baler 1106. Moreover, information may be stored remotely on a server, database, or other storage means.

A user may access the data and information via a mobile device 1130 utilizing any known means such as a dedicated application on the mobile device 1130. Moreover, a remote computer may access the data and information according to any known means. The data and information may be stored for any length of time.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method of storing information corresponding to a baled crop during a baling process, comprising:
providing a harvesting machine including a control unit, a sensor, and a bale tag reader;
forming the baled crop with a bale tag by the harvesting machine;
identifying the baled crop by the control unit with a bale identifier;
sensing a characteristic of the baled crop by the sensor;
detecting a bale tag identifier associated with the bale tag by the bale tag reader;
communicating the characteristic and bale tag identifier to the control unit;
corresponding the characteristic, bale tag identifier and bale identifier of the baled crop to one another;
storing the characteristic, bale tag identifier and bale identifier in an electronic storage unit that is in electrical communication with the control unit;
detecting information related to a carrier material;
wrapping the baled crop with the carrier material during the baling process;
communicating the information related to the carrier material to the control unit;
associating the information related to the carrier material with the characteristic, bale tag identifier and bale identifier; and
storing the information related to the carrier material in the storage unit;
wherein, the characteristic identified in the sensing step includes a quality of the baled crop.

2. The method of claim 1, further comprising communicating the characteristic, bale tag identifier and bale identifier to a remote location via a cloud-based network.

3. The method of claim 1, wherein the storing step comprises storing the characteristic, bale tag identifier and bale identifier in a data server located on the harvesting machine.

4. The method of claim 1, wherein the storing step comprises storing the characteristic, bale tag identifier and bale identifier in a data server located remotely from the harvesting machine.

5. The method of claim 1, further comprising storing the characteristic, bale tag identifier and bale identifier in a data matrix, the data matrix including a plurality of columns for the characteristic, bale tag identifier and bale identifier.

6. The method of claim 5, wherein the forming step comprises forming the baled crop with two or more bale tags coupled thereto, each of the two or more bale tags including a bale tag identifier unique to the respective bale tag;
wherein, the plurality of columns in the data matrix includes a column for each bale tag identifier for the baled crop.

7. The method of claim 5, wherein:
the forming step comprises forming a plurality of baled crops with the harvesting machine, each of the plurality of baled crops including at least one bale tag coupled thereto, and each of the at least one bale tag including a bale tag identifier unique to the respective bale tag; and
identifying each of the baled crops by the control unit with a bale identifier;
wherein, the data matrix includes a plurality of rows, and the bale identifier of each of the plurality of baled crops being stored in one of the plurality of columns and the plurality of rows.

8. The method of claim 1, further comprising electrically coupling the storage unit to a mobile device over a wireless network; and permitting access over the wireless network to the stored characteristic, bale tag identifier and bale identifier via the mobile device.

9. The method of claim 1, wherein the sensing step comprises sensing at least one of a moisture content, bale size, and nutritional value of the baled crop.

10. The method of claim 1, wherein the detecting step comprises scanning a barcode, quick response code, or RFID chip on the bale tag.

11. A communication system tracking information related to a baled crop formed during a baling process by a harvesting machine, comprising:
  a control unit for controlling the harvesting machine;
  a sensing unit mounted to the harvesting machine for detecting a characteristic of the baled crop;
  a bale tag coupled to the baled crop, the bale tag including a bale tag identifier;
  a bale tag reader for reading the bale tag identifier on the bale tag;
  an electronic storage unit disposed in electrical communication with the control unit;
  a wireless communication network electrically coupling the control unit, the sensing unit, the bale tag reader, and the electronic storage unit to one another
  a data matrix stored in the electronic storage unit, the data matrix including a plurality of columns and a plurality of rows;
  a second bale tag coupled to the baled crop, the second bale tag including a second bale tag identifier coupled thereto;
  wherein, during the baling process, the control unit assigns a unique bale identifier to each baled crop, and receives the characteristic detected by the sensing unit and the bale tag identifier from the bale tag reader via the wireless communication network, the characteristic being any of a moisture content, bale size, and nutritional value of the baled crop;
  further wherein, the control unit communicates the bale identifier, characteristic, and bale tag identifier to the storage unit via the wireless communication network;
  further wherein, the bale tag reader communicates the second bale tag identifier to the control unit, and the control unit associates the first bale tag identifier and the second bale tag identifier with the characteristic and bale identifier;
  further wherein, for each baled crop, the characteristic, bale identifier and bale tag identifier of said baled crop is recorded in one of the plurality of rows or columns of the data matrix.

12. The system of claim 11, wherein the electronic storage unit comprises a data server located on the harvesting machine.

13. The system of claim 11, wherein the electronic storage unit comprises a data server located remotely from the harvesting machine.

14. The system of claim 11, wherein the electronic storage unit comprises a memory of the control unit.

15. The system of claim 11, further comprising a mobile computing device remotely located from the harvesting machine, the mobile computing device being in electrical communication with the electronic storage device via the wireless communication network to access the characteristic, bale identifier and bale tag identifier.

16. The system of claim 11, further comprising a carrier material fastened to the baled crop during the baling process, the carrier material including a carrier material identifier;
  wherein, the carrier material identifier is communicated to the control unit and associated with the bale identifier, bale tag identifier, and characteristic of the baled crop.

17. A communication system for storing information related to a baled crop formed during a baling process by a harvesting machine, comprising:
  a control unit for controlling the harvesting machine;
  a plurality of sensors mounted to the harvesting machine for detecting a plurality of characteristics of the baled crop;
  a carrier material fastened to the baled crop during the baling process, the carrier material including a carrier material identifier;
  a bale tag coupled to the carrier material, the bale tag including a bale tag identifier;
  a bale tag reader for reading the bale tag identifier on the bale tag;
  an electronic storage unit disposed in electrical communication with the control unit;
  a wireless communication network electrically coupling the control unit, the plurality of sensors, the bale tag reader, and the electronic storage unit to one another;
  wherein, during the baling process, the control unit assigns a unique bale identifier to the baled crop, and receives the plurality of characteristics detected by the plurality of sensors and the bale tag identifier from the bale tag reader via the wireless communication network;
  wherein, the control unit communicates the bale identifier, the plurality of characteristics, and bale tag identifier to the storage unit via the wireless communication network;
  further wherein, the wireless communication network is adapted to electrically couple a mobile computing device to the electronic storage unit to allow access from a remote location to the bale identifier, the plurality of characteristics, and bale tag identifier.

18. A method of storing information corresponding to a baled crop during a baling process, comprising:
  providing a harvesting machine including a control unit, a sensor, and a bale tag reader;
  forming the baled crop with a bale tag by the harvesting machine;
  identifying the baled crop by the control unit with a bale identifier;
  sensing a characteristic of the baled crop by the sensor;
  detecting a bale tag identifier associated with the bale tag by the bale tag reader;
  communicating the characteristic and bale tag identifier to the control unit;
  corresponding the characteristic, bale tag identifier and bale identifier of the baled crop to one another;
  storing the characteristic, bale tag identifier and bale identifier in an electronic storage unit that is in electrical communication with the control unit; and
  storing the characteristic, bale tag identifier and bale identifier in a data matrix, the data matrix including a plurality of columns for the characteristic, bale tag identifier and bale identifier;
  wherein, the forming step comprises forming the baled crop with two or more bale tags coupled thereto, each of the two or more bale tags including a bale tag identifier unique to the respective bale tag;
  further wherein, the plurality of columns in the data matrix includes a column for each bale tag identifier for the baled crop.

19. A method of storing information corresponding to a baled crop during a baling process, comprising:
provieding a harvesting machine including a control unit, a sensor, and a bale tag reader;
forming the baled crop with a bale tag by the harvesting machine;
identifying the baled crop by the control unit with a bale identifier;
sensing a characteristic of the baled crop by the sensor;
detecting a bale tag identifier associated with the bale tag by the bale tag reader;
communicating the characteristic and bale tag identifier to the control unit;
corresponding the characteristic, bale tag identifier and bale identifier of the baled crop to one another;
storing the characteristic, bale tag identifier and bale identifier in an electronic storage unit that is in electrical communication with the control unit;
detecting information related to a carrier material;
wrapping the baled crop with the carrier material during the baling process;
communicating the information related to the carrier material to the control unit;
associating the information related to the carrier material with the characteristic, bale tag identifier and bale identifier; and
storing the information related to the carrier material in the storage unit.

20. The method of claim 19, further comprising:
storing the characteristic, bale tag identifier and bale identifier in a data matrix, the data matrix including a plurality of columns for the characteristic, bale tag identifier and bale identifier;
wherein the forming step comprises forming the baled crop with two or more bale tags coupled thereto, each of the two or more bale tags including a bale tag identifier unique to the respective bale tag;
wherein, the plurality of columns in the data matrix includes a column for each bale tag identifier for the baled crop.

21. A communication system tracking information related to a baled crop formed during a baling process by a harvesting machine, comprising:
a control unit for controlling the harvesting machine;
a sensing unit mounted to the harvesting machine for detecting a characteristic of the baled crop;
a bale tag coupled to the baled crop, the bale tag including a bale tag identifier;
a bale tag reader for reading the bale tag identifier on the bale tag;
an electronic storage unit disposed in electrical communication with the control unit;
a wireless communication network electrically coupling the control unit, the sensing unit, the bale tag reader, and the electronic storage unit to one another;
a second bale tag coupled to the baled crop, the second bale tag including a second bale tag identifier coupled thereto, wherein the bale tag reader communicates the second bale tag identifier to the control unit, and the control unit associates the first bale tag identifier and the second bale tag identifier with the characteristic and bale identifier; and
a data matrix stored in the electronic storage unit, the data matrix including a plurality of columns and a plurality of rows;
wherein, for each baled crop, the characteristic, bale identifier and bale tag identifier of said baled crop is recorded in one of the plurality of rows or columns of the data matrix;
further wherein, during the baling process, the control unit assigns a unique bale identifier to each baled crop, and receives the characteristic detected by the sensing unit and the bale tag identifier from the bale tag reader via the wireless communication network;
further wherein, the control unit communicates the bale identifier, characteristic, and bale tag identifier to the storage unit via the wireless communication network.

22. The communication system tracking information related to a baled crop formed during a baling process of claim 21, further comprising:
a carrier material fastened to the baled crop during the baling process, the carrier material including a carrier material identifier;
wherein, the carrier material identifier is communicated to the control unit and associated with the bale identifier, bale tag identifier, and characteristic of the baled crop.

23. A communication system tracking information related to a baled crop formed during a baling process by a harvesting machine, comprising:
a control unit for controlling the harvesting machine;
a sensing unit mounted to the harvesting machine for detecting a characteristic of the baled crop;
a bale tag coupled to the baled crop, the bale tag including a bale tag identifier;
a bale tag reader for reading the bale tag identifier on the bale tag;
an electronic storage unit disposed in electrical communication with the control unit;
a wireless communication network electrically coupling the control unit, the sensing unit, the bale tag reader, and the electronic storage unit to one another; and
a carrier material fastened to the baled crop during the baling process, the carrier material including a carrier material identifier;
wherein, the carrier material identifier is communicated to the control unit and associated with the bale identifier, bale tag identifier, and characteristic of the baled crop;
further wherein, during the baling process, the control unit assigns a unique bale identifier to each baled crop, and receives the characteristic detected by the sensing unit and the bale tag identifier from the bale tag reader via the wireless communication network;
further wherein, the control unit communicates the bale identifier, characteristic, and bale tag identifier to the storage unit via the wireless communication network.

24. The communication system tracking information related to a baled crop formed during a baling process of claim 23, further comprising a mobile computing device remotely located from the harvesting machine, the mobile computing device being in electrical communication with the electronic storage device via the wireless communication network to access the characteristic, bale identifier and bale tag identifier.

* * * * *